US010755579B2

(12) United States Patent
Klopfenstein

(10) Patent No.: US 10,755,579 B2
(45) Date of Patent: Aug. 25, 2020

(54) AUTONOMOUS VEHICLE CONTROL

(71) Applicant: Cisco Technology, Inc., San Jose, CA (US)

(72) Inventor: Jeffery Brian Klopfenstein, Raleigh, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 225 days.

(21) Appl. No.: 15/935,893

(22) Filed: Mar. 26, 2018

(65) Prior Publication Data

US 2019/0139418 A1    May 9, 2019

Related U.S. Application Data

(60) Provisional application No. 62/581,481, filed on Nov. 3, 2017.

(51) Int. Cl.
*G08G 1/00* (2006.01)
*G08G 1/01* (2006.01)
(Continued)

(52) U.S. Cl.
CPC .......... *G08G 1/207* (2013.01); *G05D 1/0088* (2013.01); *G08G 1/0116* (2013.01);
(Continued)

(58) Field of Classification Search
CPC .......... G08G 1/207; G08G 1/0133; G08G 1/096725; G08G 1/096775; G08G 1/096811; G05D 1/0088
(Continued)

(56) References Cited

U.S. PATENT DOCUMENTS 6,129,025 A    10/2000  Minakami et al.
9,302,678 B2 *  4/2016  Murphy .............. B60W 50/14
(Continued)

FOREIGN PATENT DOCUMENTS

EP    2575399 A1    4/2013

OTHER PUBLICATIONS

Pagarkar, et al., "Automated Vehicle Control System", Third Year Information Technology Engineering V.E.S.I.T., Chamber, Mumbai 71, 12 pages.
(Continued)

*Primary Examiner* — Yazan A Soofi
(74) *Attorney, Agent, or Firm* — Johnson, Marcou, Isaacs & Nix, LLC

(57) ABSTRACT

Controlling autonomous vehicles in interface regions of multilane roads by receiving, from at least one first autonomous vehicle entering an interface region of a multilane road in a first direction, a current first autonomous vehicle destination. Receiving, from at least one second autonomous vehicle exiting the interface region from the first direction, a current second autonomous vehicle status as exiting the road. Receiving, from at least one traffic system covering the interface region, traffic data applicable to the interface region. Determining, based at least in part on each received destination, each received exiting status, and the received traffic data, an operating parameters envelope for each autonomous vehicle entering the interface region in the first direction. Transmitting, to each corresponding autonomous vehicle entering the interface region in the first direction, instructions to apply the corresponding determined operating parameters envelope.

17 Claims, 7 Drawing Sheets

(51) Int. Cl.
   *G08G 1/0967* (2006.01)
   *G08G 1/0968* (2006.01)
   *G05D 1/00* (2006.01)
(52) U.S. Cl.
   CPC ......... *G08G 1/0133* (2013.01); *G08G 1/0145* (2013.01); *G08G 1/096725* (2013.01); *G08G 1/096741* (2013.01); *G08G 1/096775* (2013.01); *G08G 1/096811* (2013.01)
(58) Field of Classification Search
   USPC .......................................................... 701/24
   See application file for complete search history.

(56) References Cited

U.S. PATENT DOCUMENTS

| | | | |
|---|---|---|---|
| 9,672,734 B1* | 6/2017 | Ratnasingam | H04L 67/12 |
| 2007/0276600 A1 | 11/2007 | King et al. | |
| 2016/0357185 A1* | 12/2016 | Laur | B60K 28/06 |
| 2016/0363935 A1* | 12/2016 | Shuster | G01C 21/3602 |
| 2017/0160745 A1* | 6/2017 | Lauffer | G01S 13/931 |
| 2018/0089563 A1* | 3/2018 | Redding | G06F 16/9027 |
| 2018/0237019 A1* | 8/2018 | Goto | B60W 30/12 |
| 2018/0244275 A1* | 8/2018 | Bremkens | B60W 30/18163 |
| 2018/0268695 A1* | 9/2018 | Agnew | B60W 30/09 |
| 2018/0336780 A1* | 11/2018 | Ran | G08G 1/017 |
| 2019/0025835 A1* | 1/2019 | Xu | B60W 50/0098 |
| 2019/0164424 A1* | 5/2019 | Kleen | G08G 1/096741 |

OTHER PUBLICATIONS

Sattibabu, et al., "Automatic Vehicle Speed Control with Wireless in-Vehicle Road Sign Delivery System Using ARM 7", International Journal of Technology Enhancements and Emerging Engineering Research, vol. 2, Issue 8 32, ISSN 2347-4289, 3 pages.

* cited by examiner

300

310
Receive, from at least one first autonomous vehicle entering an interface region of a multilane road in a first direction, a current first autonomous vehicle destination

320
Receive, from at least one second autonomous vehicle exiting the interface region from the first direction, a current second autonomous vehicle status as exiting the road

330
Receive, from at least one traffic system covering the interface region, traffic data applicable to the interface region

340
Determine, based at least in part on each received destination, exiting status, and traffic data, an operating parameters envelope for each autonomous vehicle entering the interface region in the first direction

350
Transmit, to each corresponding autonomous vehicle entering the interface region in the first direction, instructions to apply the corresponding determined operating parameters envelope

Receive, from at least one first autonomous vehicle entering an interface region of a multilane road in a first direction, a current first autonomous vehicle destination
310

Receive, from at least one second autonomous vehicle exiting the interface region from the first direction, a current second autonomous vehicle status as exiting the road
320

Receive, from at least one traffic system, traffic data applicable to the interface region and traffic data applicable to an area outside the interface region
630

Determine, based at least in part on each received destination, exiting status, and traffic data, an operating parameters envelope for each autonomous vehicle entering or traversing the interface region in the first direction
540

Transmit, to each corresponding autonomous vehicle entering the interface region in the first direction, instructions to apply the corresponding determined operating parameters envelope
350

FIG. 6

AUTONOMOUS VEHICLE CONTROL

CROSS REFERENCE TO RELATED APPLICATIONS

This application claims the benefit of U.S. Provisional Application No. 62/581,481 filed Nov. 3, 2017 and entitled "Programmable and Autonomous Smart-highway Data Communications Network for Guiding Self-driving Vehicles from On-ramp To Off-ramp," the contents of which are hereby incorporated herein by reference in their entirety.

TECHNICAL FIELD

The disclosed technology relates to autonomous vehicle control. Particular embodiments relate to loosely coupled control of autonomous vehicles in intersection regions of multilane roads.

BACKGROUND

In a generally accepted definition, an autonomous vehicle is a wheeled transportation device that can operate on conventional roads with little or no human intervention. The Society of Automotive Engineers (SAE) and the National Highway Traffic Safety Administration recognize six (6) levels of automation from SAE Level 0, in which the vehicle issues warnings to the driver and may momentarily intervene but has no sustained vehicle control, to SAE Level 5, in which no human intervention is required.

Multilane roads run the gamut from: undivided three-lane roads with at-grade crossings and property access along the shoulder (where the middle, or third, lane is used for cross traffic entrance and exit to the travel lanes); to controlled-access highways, in which opposite directions of travel are divided by a physical barrier such as a median or wall, ingress and egress are through ramps, and at-grade crossings are not present.

BRIEF DESCRIPTION OF THE DRAWINGS

FIG. 3 is a block flow diagram depicting methods to control autonomous vehicles in interface regions of multilane roads, in accordance with certain example embodiments.

FIG. 6 is a block flow diagram depicting methods to control autonomous vehicles in interface regions of multilane roads, in accordance with certain example embodiments.

DETAILED DESCRIPTION OF EXAMPLE EMBODIMENTS

Figure 1:
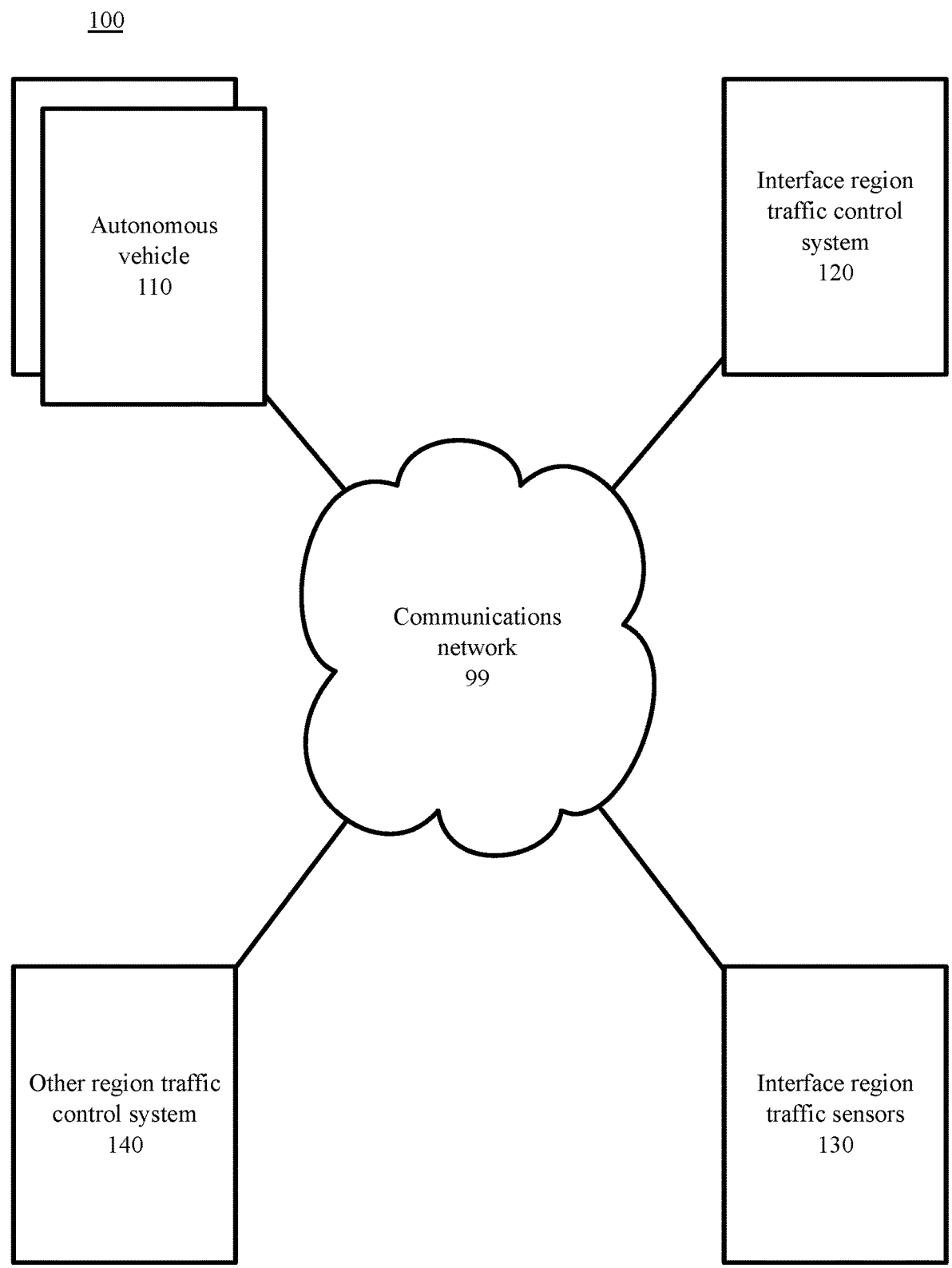
FIG. 1 is a block diagram depicting a communications and processing architecture to control autonomous vehicles in interface regions of multilane roads, in accordance with certain example embodiments.

As measured by the SAE autonomy levels, production model autonomous vehicle technology has advanced over the past twenty years. Before 2003, only SAE Level 0 warning systems were available in production vehicles in the United States. Then in 2003, a major automobile manufacturer introduced the first production model passenger vehicle with automatic parking. Automatic parking can be seen as a mode-specific (mode=parking) SAE Level 2 capability. By 2012, automatic parking was available across the inventories of six (6) major automobile manufacturers in the United States. In 2017, one automobile manufacturer introduced a production model in the United States capable of SAE Level 3 autonomy in which the driver can avert their attention away from driving, but must be prepared to intervene.

Other than through the use of external signals for geolocation, each production model vehicle that is available in the United States and meets some SAE level of automation relies on on-board sensors and on-board processing for autonomous driving function. Active external signals, for example, from systems associated with the road itself to the vehicle, while contemplated, are not known in practice on public roads in this country.

One challenge facing developers of an integrated autonomous vehicle/active road system is to reconcile the autonomy of the vehicle's on-board sensors and processing with the degree of tightly-coupled system-level control typically exerted in large systems. Tight coupling between autonomous vehicles and road elements of an integrated system would require coordination across vehicle manufacturers and road designers, and would involve enormous investment in infrastructure to implement across a country having a wide variety of state and local laws. Further, it is not apparent how a tightly coupled integrated autonomous vehicle/active road system would work in the presence of conventional vehicles.

Embodiments herein provide computer-implemented methods, systems, and computer program products to control autonomous vehicles in interface regions of multilane roads. "Interface region," as used herein, includes regions of the road with one or more entrances or exits to the main roadway.

While enabling examples disclosed herein are based on entrance ramp and exit ramp regions of controlled-access highways without at-grade crossings and with a physical separation (for example, barrier or median) between lanes of opposing traffic, the technology disclosed herein can find use in all types of multilane roads. For example, the technology disclosed herein can find use in divided roads with traffic circle at-grade crossings, roads with left exits, tollbooth facilities, and transportation hub arrival and departure access areas (known to experience highly dynamic double, and even triple, parking situations that present challenges akin to the previously-mentioned interface regions).

In embodiments disclosed herein, the technology prepares an autonomous vehicle-specific operating parameter envelope for each participating autonomous vehicle as that vehicle enters an interface region. In some embodiments, the technology receives a communication describing the autonomous vehicle's destination, using the destination in preparing the operating parameter envelope. The technology then transmits the vehicle-specific operating parameters envelope to the specific vehicle. The specific vehicle, in turn, applies the operating parameters envelope to its otherwise-autonomous operation while in the interface region.

By using and relying on the methods and systems described herein, the technology disclosed herein provides for loose coupling (both functionally and spatially) between the autonomous vehicles and the roads, while not requiring all vehicles on the road to participate in the technology. As such, the technologies described herein may be employed to control a wide variety of autonomous vehicles in a vehicle set that includes conventional operator-controlled vehicles, as these vehicles navigate through an interface region. The technology accounts for circumstances such vehicles entering, exiting, and merely traversing the interface region. The technology can adapt to events such as lane closures. The technology can urge autonomous vehicles into travel patterns that prepare traffic for spatiotemporal road characteristics outside the interface region.

These and other aspects, objects, features, and advantages of the example embodiments will become apparent to those having ordinary skill in the art upon consideration of the following detailed description of illustrated example embodiments. Turning now to the drawings, in which like numerals represent like (but not necessarily identical) elements throughout the figures, example embodiments are described in detail.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

FIG. 1 is a block diagram depicting a communications and processing architecture 100 for controlling autonomous vehicles in interface regions of multilane roads. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes a plurality of autonomous vehicles 110, an interface region traffic control server 120, plurality of interface region traffic sensors 130, and one or more other region traffic control systems 140, connected by communications network 99. In some embodiments, a user associated with a device must install an application and/or make a feature selection to obtain the benefits of the technology described herein.

Network 99 includes one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, 130, and 140, can include a communication subsystem capable of transmitting and receiving data over the network(s) it communicates with. For example, each network device can include a server, or a partition of a server, router virtual machine (VM) or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, a user associated with a device must install an application and/or make a feature selection to obtain the benefits of the technology described herein.

The network connections illustrated are examples and other approaches for establishing a communications link between the computers and devices can be used. Additionally, those having ordinary skill in the art and having the benefit of this disclosure will appreciate that the network devices illustrated in FIG. 1 may have any of several other suitable computer system configurations, and may not include all the components described above.

Figure 7:
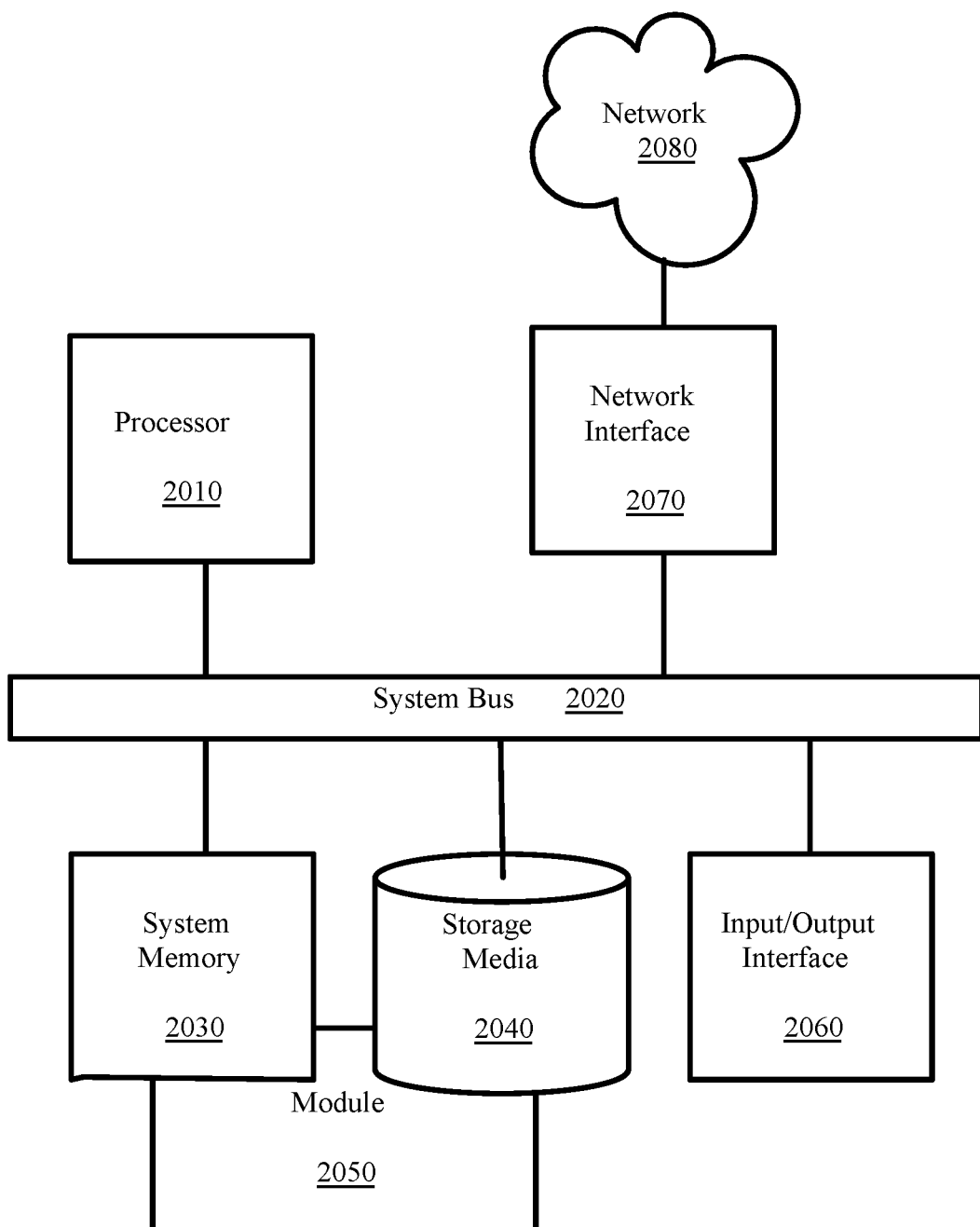
FIG. 7 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as network 99. Each network may include various types of data or communications network, including any of the network technology discussed with respect to FIG. 7.

Example Embodiments

The examples illustrated in the following figures are described hereinafter with respect to the components of the example operating environment and example architecture 100 described elsewhere herein. The example embodiments may also be practiced with other systems and in other environments. The operations described with respect to the example processes can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
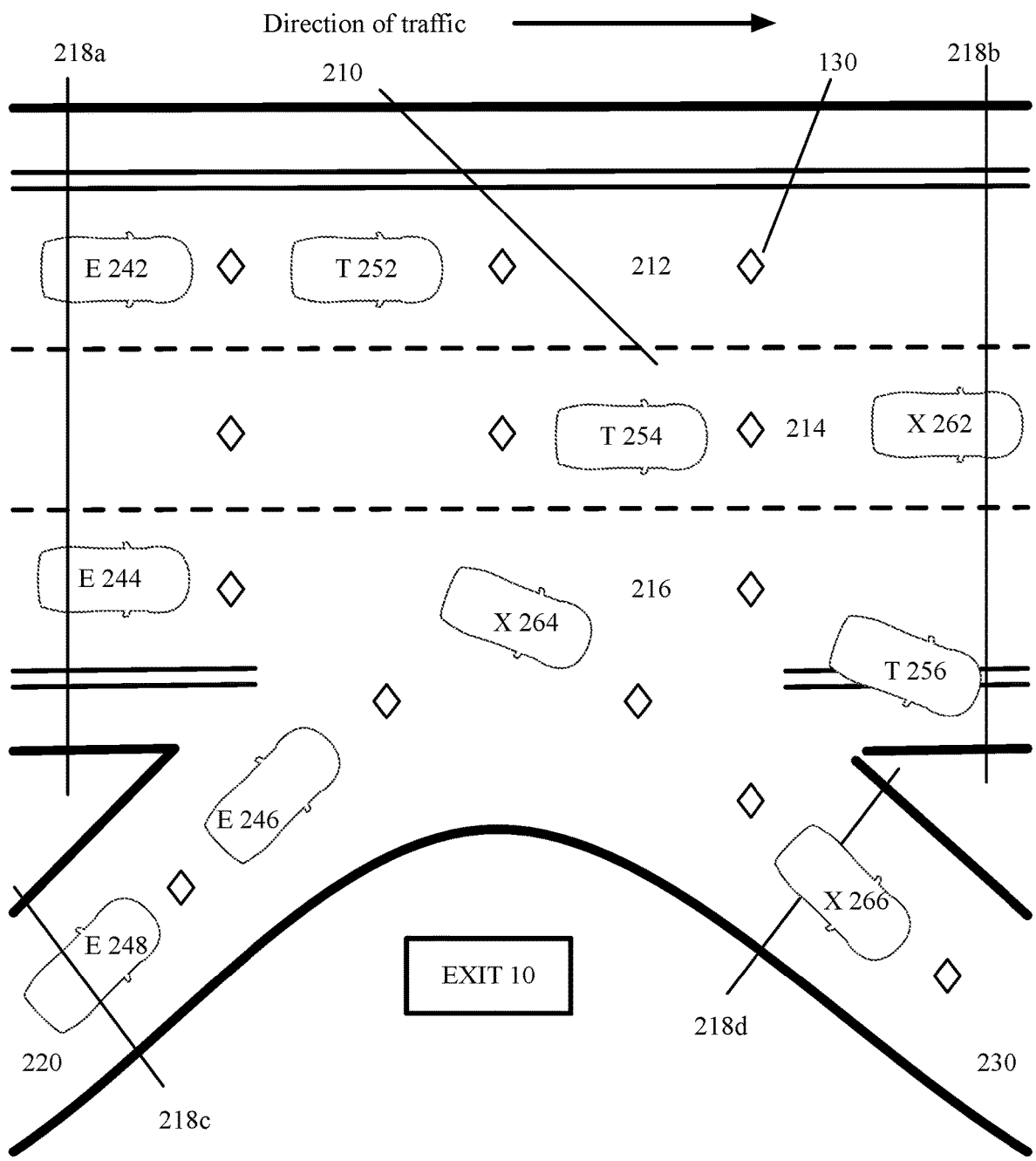
FIG. 2 is a schematic diagram representing an interface region of a multilane road, in accordance with certain example embodiments.

Referring to FIG. 2, and continuing to refer to FIG. 1 for context, a schematic diagram representing an interface region 200 of a multilane road is shown, in accordance with certain example embodiments. The interface region 200 includes a set of three (3) through-lanes 212, 214, and 216, an entrance ramp 220, and an exit ramp 230. The exit is identified as "Exit 10"—an exit at mile marker "10" with later exits in the direction of traffic increasing in exit number.

FIG. 2 indicates two entrances 218a, 218c to the interface region 200. Entrance 218a indicates an entrance to the interface region 200 from the through lanes 212, 214, and 216. Entrance 218c indicates an entrance to the interface region 200 via the entrance ramp 220. While the entrances 218a, 218c are shown as relatively close to the center of the interface region 200 for compact representation in the figure, in practice, the entrances 218a, 218c can be established substantially earlier in the traffic flow. As an example, entrance 218c, associated with entrance ramp 220 can be located where the entrance ramp 220 first separates from any previous road. As another example, entrance 218a can be located a distance earlier in the traffic flow (for example, well off the left edge of the page in FIG. 2). Earlier location of the entrances 218a and 218c to the interface region 200 allows for more time and distance for a participating autonomous vehicle to adapt its operation to an operating parameters envelope transmitted to the participating autonomous vehicle from the traffic control system 120.

FIG. 2 indicates two exits 218b, 218d from the interface region 200. Exit 218b indicates an exit from the interface region 200 from the through lanes 212, 214, and 216. Exit 218d indicates an exit from the interface region 200 via the exit ramp 230. While the exits 218b, 218d are shown as relatively close to the center of the interface region 200 for compact representation in the figure, in practice, the exits 218b, 218d can be established substantially at other points in the traffic flow. As an example, the boundary of exit 218b in the leftmost lane 212 can be located a distance earlier, or later, in the traffic flow.

In practice, considerations such as 1) processing latency and communications latency between various autonomous vehicles 110 and the interface region traffic control system 120, 2) the expected maximum speed of the vehicles in the interface region 200, 3) the expected implementation time that such vehicles may conform vehicle operation to the set of vehicle-specific operating parameters envelopes, and 4) physical constraints related to the road and rights-of-way/easements will determine placement of the entrances 218a, 218c and exits 218b, 218d.

Throughout this disclosure, some events will be described with "as entering the interface region" and "as exiting the interface region." Unless otherwise qualified, such expressions, and others similar to them, include the period just before, and just after, crossing an entrance or exit.

FIG. 2 also illustrates vehicles E242, E244, E246, and E248 as entering the interface region 200; vehicles X262, X264, and X266 as exiting the interface region 200; and vehicles T252 and T254 as passing through the interface region. FIG. 2 illustrates disabled vehicle T256 partially blocking lane 216. Finally, FIG. 2 shows a set of interface region traffic sensors 130 deployed throughout the interface region 200, including on the through lanes 212, 214, and 216, on the entrance ramp 220 and on the exit ramp 230. Each vehicle shown in FIG. 2 may implement any one of the SAE levels of autonomy.

Referring to FIG. 3, and continuing to refer to prior figures for context, a block flow diagram 300 depicting methods to control autonomous vehicles in interface regions of multilane roads, in accordance with certain example embodiments. In such methods 300, one or more computing devices receive a current first autonomous vehicle destination from at least one first autonomous vehicle entering an interface region of a multilane road in a first direction—Block 310. In a continuing example, interface region traffic control system 120 (hereinafter "traffic control system 120") receives, via network 99, an indication of destination from each of vehicles E242, and E248 as those vehicles enter the interface region 200. Earlier, the traffic control system received an indication of destination from each of vehicles E246, T252, X264, and X262. Vehicles E244, T254, T256, and X266 are each either non-autonomous, or simply not actively participating in the technology disclosed herein.

TABLE 1 summarizes the received destination information, both current and past, for the vehicles in interface region 200. Note that E242, T252, and E248 each have equivalent, but differently expressed, destination information. In general, while uniform expression of destination would be convenient, it is not necessary as long as the traffic control system 120 can determine that the point at which the vehicle is expected to depart the road is close enough that the vehicle should begin to alter its operating parameters (for example, migrate to the right, lane-wise) while in the interface region 200, or that the destination is far enough away that the vehicle can continue in the leftmost available lanes.

TABLE 1

| Vehicle | Destination information |
| --- | --- |
| E 242 | Exit 12 |
| E 244 | -no info- |
| E 246 | Exit 37 |
| E 248 | Buffalo, Exit 37 |
| T 252 | Springfield, Exit 12 |
| T 254 | -no info- |
| T 256 | -no info- |
| X 262 | Exit 20 |
| X 264 | Exit 10 |
| X 266 | Exit 10 |

The one or more computing devices receives, from at least one second autonomous vehicle exiting the interface region from the first direction, a current second autonomous vehicle status as exiting the road—Block 320. In the continuing example, the traffic control system 120 receives, via network 99, an exiting status from vehicles X262 and X266 as those vehicles cross an interface region 200 boundary. While the traffic control system 120 has not yet received an exiting status from vehicle X264, the traffic control system 120 previously received "Exit 10" as the destination of vehicle X264, and absent unusual circumstances, will soon receive an exit status from vehicle X264. TABLE 2 is a version of TABLE 1 with the received exiting status information added.

TABLE 2

| Vehicle | Destination information | Exiting Status |
| --- | --- | --- |
| E 242 | Exit 12 | none |
| E 244 | -no info- | -no info- |
| E 246 | Exit 37 | none |
| E 248 | Buffalo, Exit 37 | none |
| T 252 | Springfield, Exit 11 | none |
| T 254 | -no info- | -no info- |
| T 256 | -no info- | -no info- |
| X 262 | Exit 20 | exiting |
| X 264 | Exit 10 | none |
| X 266 | Exit 10 | exiting |

The one or more computing devices receives, from at least one traffic system covering the interface region, traffic data applicable to the interface region—Block 330. In the continuing example, the traffic control system 120 receives, via network 99, sensor data from interface region sensors 130. In particular, even without autonomous vehicles E244 and T254 actively participating in the technology (for example, by providing destination information to the traffic control system) sensors 130 will sense vehicle E244 traveling in lane 216 at its actual speed and will sense vehicle T254 traveling in lane 214 at its actual speed. The traffic data also includes the status of vehicle T256 as blocking lane 216. TABLE 3 is a version of TABLE 2 with the received traffic data from sensors 270 covering the interface region 200 added.

TABLE 3

| Vehicle | Destination information | Exiting Status | Traffic Data |
|---|---|---|---|
| E 242 | Exit 12 | none | 50 m.p.h., Lane 212, position 1 |
| E 244 | -no info- | -no info- | 40 m.p.h., Lane 216, position 1 |
| E 246 | Exit 37 | none | 30 m.p.h., Ramp 220, position 2 |
| E 248 | Buffalo, Exit 37 | none | 25 m.p.h., Ramp 220, position 1 |
| T 252 | Springfield, Exit 12 | none | 40 m.p.h., Lane 212, position 2 |
| T 254 | -no info- | -no info- | 40 m.p.h., Lane 214, position 3 |
| T 256 | -no info- | -no info- | 0 m.p.h., Lane 216, position 4 |
| X 262 | Exit 20 | exiting | 40 m.p.h., Lane 214, position 4 |
| X 264 | Exit 10 | none | 40 m.p.h., Lane 216, position 2 |
| X 266 | Exit 10 | exiting | 40 m.p.h., Ramp 230, position 2 |

The one or more computing devices determines an operating parameters envelope for each autonomous vehicle entering the interface region in the first direction, based at least in part on each received destination, each received exiting status, and the received traffic data—Block 340. In the continuing example, the interface region traffic control system 120 is part of an intelligent transportation system; though participation of every vehicle in the interface region in such a system is not a requirement of the present technology. As part of the intelligent transportation system, traffic control system 120 includes information on both the topology and status of roads outside the interface region 200. In the continuing example, at least one other region traffic control system 140 reports an accident in the right-most lane of the roadway one mile before Exit 12, but not interfering with exiting from Exit 12.

For autonomous vehicle E242, the traffic control system 120 considers that in order to exit at Exit 12 (which is also Springfield, the exit point for autonomous vehicle T252, and the next exit on the road), autonomous vehicle E242 must move two (2) lanes to the right, and adapt to the speed for those lanes in a way that supports all through traffic. The traffic control system 120 determines an operating parameters envelope for E242 that includes: lane change to lane 214 and max speed 45 m.p.h. in region 200. While the overall traffic system could determine an operating parameters envelope that includes no lane change to lane 216 until after the accident at mile 11; in fact, were the interface region 200 to extend to the accident scene, the traffic control system would include this last restriction.

As another example, instead of the control system 120 prescribing the lane change for each vehicle, control system 120 adjusts a target speed for each vehicle in each lanes accordingly, and removes lane 216 out of the available lanes to choose from, until an interface region that is after mile 11. Further, a congestion or "high traffic volume" indicator can be part of the envelope, leveraging knowledge of the number of vehicle exit statuses in a given interface region, along with sensor data, to let other vehicles know of high-volume/ congested situations (possibly in addition to, or instead of, transmitting a new, lower, target speed parameter to the vehicles), to maintain smooth and safe traffic flow.

Returning to the continuing example, for autonomous vehicle E248, the traffic control system 120 considers that the vehicle has a destination beyond a predetermined distance from Exit 10, that is, autonomous vehicle E248 is continuing twenty seven (27) miles on the road to exit at Buffalo. In practice, simply knowing that a vehicle intends to exit beyond a threshold distance away from the interface region will be sufficient to recommend that the vehicle stay in the far left lane if that lane is available. In the continuing example, the operating parameter envelope for E248 in the interface region is to proceed to through lane 216 at no more than 35 m.p.h., switching to lane 214 at no more than 45 m.p.h. before encountering the disabled vehicle T256, and then switching to lane 212 at no more than 50 m.p.h. As an example of the "envelope" nature of the operating parameters envelope, if T254 (not an autonomous vehicle, so the traffic control system 120 does not have data on its destination) brakes suddenly, blocking E248 from moving into lane 214, E248 will delay a move into lane 214 based on E248's on board autonomous vehicle controls.

The one or more computing devices transmits, to each corresponding autonomous vehicle entering the interface region in the first direction, instructions to apply the corresponding determined operating parameters envelope. Block 350. In the continuing example, the traffic control system 120 uses Wi-Fi to transmit a stream of operating parameters envelopes over network 99. Each envelope is associated with an identifier allowing the intended recipient autonomous vehicle 110 in the interface region to filter out the operating parameter envelope applicable to that intended recipient.

Figure 4:
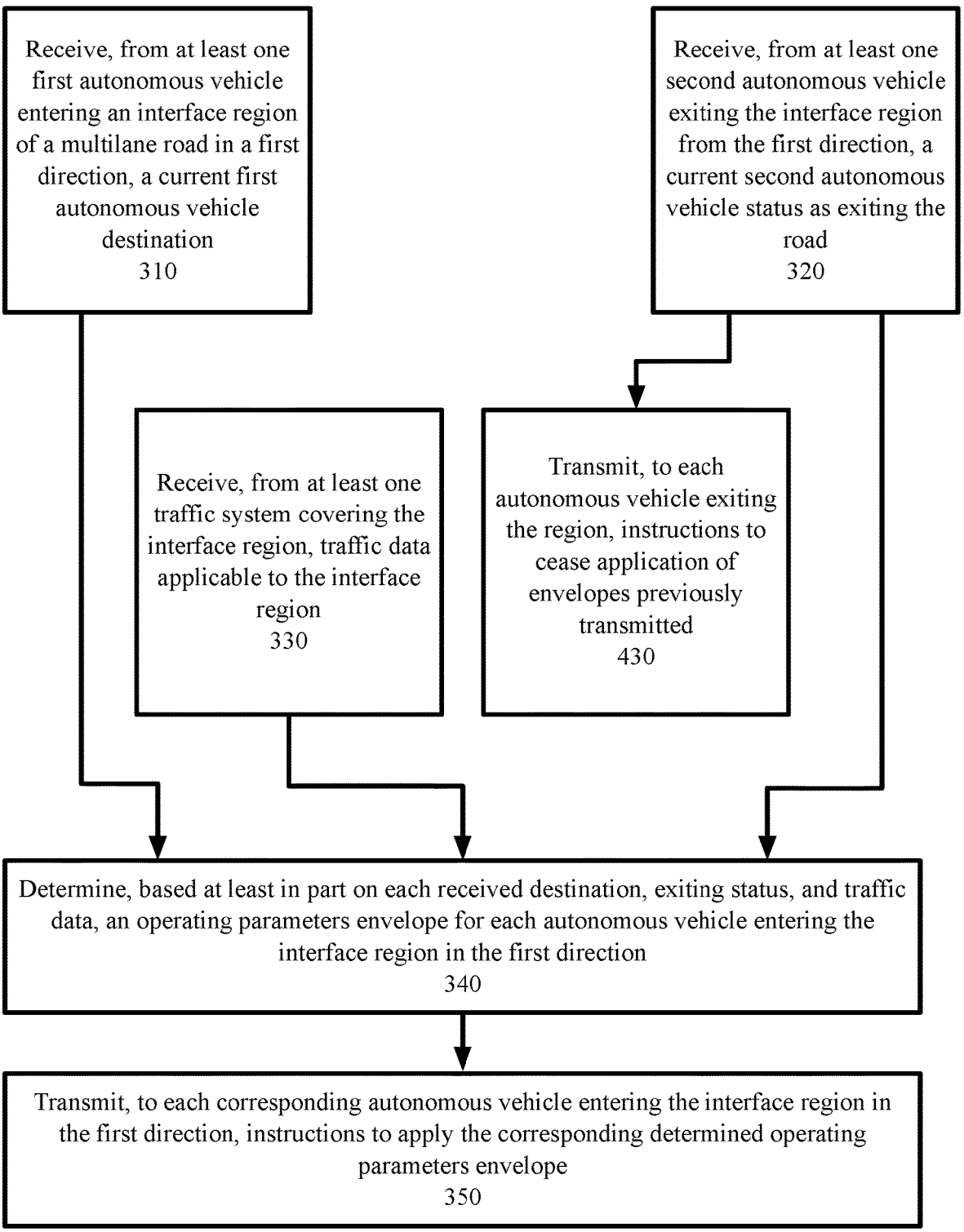
FIG. 4 is a block flow diagram depicting methods to control autonomous vehicles in interface regions of multilane roads, in accordance with certain example embodiments.

Referring to FIG. 4, and continuing to refer to prior figures for context, a block flow diagram 400 depicting methods to control autonomous vehicles in interface regions of multilane roads, in accordance with certain example embodiments. In such methods 400, the one or more computing devices transmits, to each autonomous vehicle exiting the interface region, instructions to cease application of any operating parameters envelope previously transmitted by the one or more computing devices—Block 460. In the continuing example, the traffic control system 120 transmits, over network 99, an instruction to each of autonomous vehicle X266 and autonomous vehicle X262 to cease application of the operating parameter envelopes previously-transmitted to those vehicles.

In some embodiments of the technology disclosed herein, the previously transmitted operating parameter envelopes are configured to expire based on one or more of time and location of the corresponding autonomous vehicle 110. When an operating parameter envelope expires, the corresponding autonomous vehicle 110 merely continues its autonomous operation in the absence of any previously transmitted operating parameter envelopes.

In some embodiments, the traffic control system 120 instructs the exiting autonomous vehicle to cease application of only certain portions of the instructions. For example, the traffic control system 120 determines that some portions of the operating parameters envelope are applicable to the road until the next interface region is encountered, and indicates such in a transmission to the corresponding autonomous vehicle 110.

Figure 5:
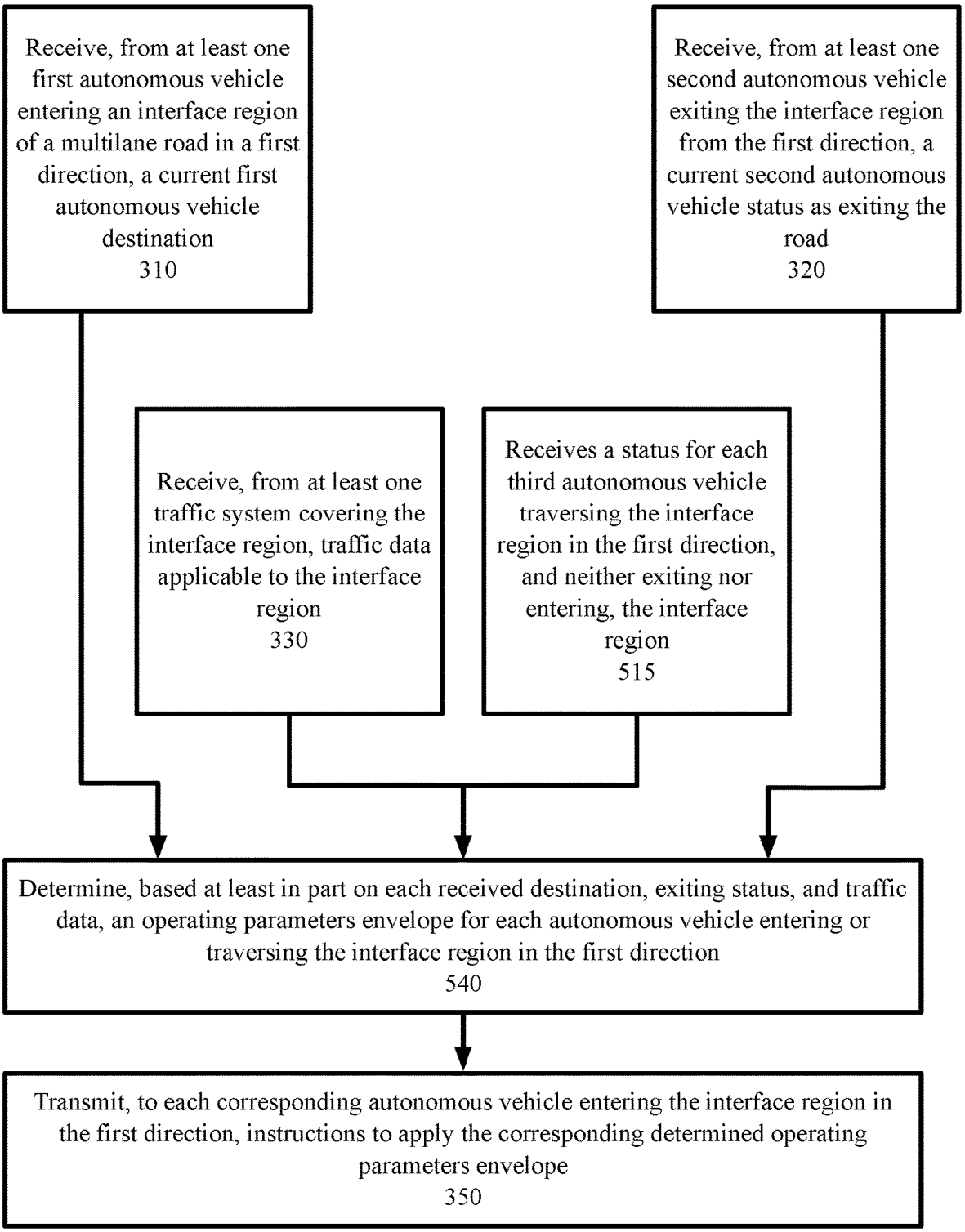
FIG. 5 is a block flow diagram depicting methods to control autonomous vehicles in interface regions of multilane roads, in accordance with certain example embodiments.

Referring to FIG. 5, and continuing to refer to prior figures for context, a block flow diagram 500 depicting methods to control autonomous vehicles in interface regions of multilane roads, in accordance with certain example embodiments. In such methods 500, the one or more computing devices receives a status for each third autonomous vehicle traversing the interface region in the first direction, and neither exiting nor entering, the interface region—Block 515. In the continuing example, traffic control system 120 receives a status from autonomous vehicle T252 that indicates a change in destination to "Exit 37." Previously, upon entering the interface regions 200, autonomous vehicle T252 indicated "Springfield, Exit 12" as its destination. That destination resulted in an operating parameter envelope being transmitted to autonomous vehicle T252 from traffic control system 120, over network 99, that encouraged autonomous vehicle T252 to change lanes from Lane 212 to Lane 214 within the interface region 200.

In response to receiving the updated destination information, the one or more computing devices determines a new operating parameters envelope for each third autonomous vehicle based, at least in part, on the each received status—Block 540. In the continuing example, the traffic control system 120, in response to receiving "Exit 37" as an updated destination for autonomous vehicle T252, in addition to determining operating parameters envelopes for autonomous vehicles entering the interface region, determined a new operating parameters envelope for T252 based, at least in part on the new destination information.

Referring to FIG. 6, and continuing to refer to prior figures for context, a block flow diagram 600 depicting methods to control autonomous vehicles in interface regions of multilane roads, in accordance with certain example embodiments. In such methods 600, the one or more computing devices receives traffic data applicable to an area outside the interface region, in addition to traffic data for the interface region—Block 630. The determination of operating parameter envelopes is based at least in part on the received traffic data applicable to an area outside the interface region along with the received traffic data applicable to the interface region. In the continuing example, the traffic control system 120 receives information of an accident in the right-most lane of the roadway one mile before Exit 12, but not interfering with exiting from Exit 12. The traffic control system determines an operating parameter envelope for each of autonomous vehicle with a destination after the accident. In particular, after autonomous vehicle T252 changes its destination to "Buffalo," only autonomous vehicle E242 has Exit 12 as a destination. In this case, traffic control system 120 determines "move to Lane 216 and reduce speed to exit at Exit 12" as part of the operating parameters envelop to be transmitted over network 99 to autonomous vehicle E242, and further, that such operating parameter persist past the exit from the interface region 200.

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

I claim:

1. A computer-implemented method to control autonomous vehicles in interface regions of multilane roads, comprising:
   receiving, by one or more computing devices, from at least one first autonomous vehicle entering an interface region of a multilane road in a first direction, a current first autonomous vehicle destination, wherein the one or more computing devices are associated with the multilane road;
   receiving, by the one or more computing devices, from at least one second autonomous vehicle exiting the interface region from the first direction, a current second autonomous vehicle status as exiting the multilane road;
   receiving, by the one or more computing devices, from at least one traffic system covering the interface region, traffic data applicable to the interface region;
   determining, by the one or more computing devices, based at least in part on each received destination, each received exiting status, and the received traffic data, an operating parameters envelope for each autonomous vehicle entering the interface region in the first direction, wherein the one or more computing devices are separate and distinct from each autonomous vehicle, and the operating parameters envelope comprises at least one parameter of: one or more discouraged lanes, one or more lane prohibitions, a target speed, a follow distance, and a congestion indication for one or more lanes; and
   transmitting, by the one or more computing devices to each corresponding autonomous vehicle entering the interface region in the first direction, instructions to apply the corresponding determined operating parameters envelope.

2. The method of claim 1, wherein entering the interface region comprises, for each first autonomous vehicle, one of:
   entering the interface region while traveling on the multilane road, and
   entering the multilane road; and exiting the interface region comprises, for each second autonomous vehicle, one of:
   exiting the interface region while traveling on the multilane road, and
   exiting the multilane road.

3. The method of claim 1, further comprising
   transmitting, by the one or more computing devices to each autonomous vehicle exiting the interface region, instructions to cease application of one or more of the parameters of any operating parameters envelope previously transmitted by the one or more computing devices.

4. The method of claim 1, wherein the multilane road is a limited access highway and entering the interface region comprises at least one of entering the interface region via an on-ramp of the limited access highway and entering the interface region via a main lane of the multilane road.

5. The method of claim 1 further comprising
   receiving, by the one or more computing devices, a status for each third autonomous vehicle traversing the interface region in the first direction, and neither exiting nor entering, the interface region and
   wherein determining further comprises determining, by the one or more computing devices, at least in part based on each received status, the operating parameters envelope for each third autonomous vehicle.

6. The method of claim 1 further comprising
   receiving, by the one or more computing devices, from at least one traffic system covering an area beyond the interface region in the direction of traffic, traffic data applicable to the area beyond the interface region; and
   wherein the determining is further based at least in part on the received traffic data applicable to the area beyond the interface region.

7. A computer program product, comprising:
   a non-transitory computer-readable storage device having computer-executable_program instructions embodied thereon that when executed by a computer cause the computer to control autonomous vehicles in interface regions of multilane roads, the computer-executable program instructions comprising:
   computer-executable program instructions to receive, from at least one first autonomous vehicle entering an interface region of a multilane road in a first direction, a current first autonomous vehicle destination;
   computer-executable program instructions to receive, from at least one second autonomous vehicle exiting the interface region from the first direction, a current second autonomous vehicle status as exiting the multilane road;
   computer-executable program instructions to receive, from at least one traffic system covering the interface region, traffic data applicable to the interface region;
   computer-executable program instructions to determine, based at least in part on each received destination, each received exiting status, and the received traffic data, an operating parameters envelope for each autonomous vehicle remaining on the multilane road in the interface region in the first direction, wherein the computer is separate and distinct from each autonomous vehicle, and the operating parameters envelope comprises at least one parameter of: one or more discouraged lanes, one or more lane prohibitions, a target speed, a follow distance, and a congestion indication for one or more lanes; and
   computer-executable program instructions to transmit, to each corresponding autonomous vehicle remaining on the multilane road in the interface region in the first direction, instructions to apply the corresponding determined operating parameters envelope.

8. The computer program product of claim 7, wherein entering the interface region comprises, for each first autonomous vehicle, one of:

entering the interface region while traveling on the multilane road, and entering the multilane road; and exiting the interface region comprises, for each second autonomous vehicle, one of:

exiting the region while traveling on the multilane road, and exiting the multilane road.

9. The computer program product of claim 7, wherein the computer-executable program instructions further comprise computer-executable program instructions to transmit, to each autonomous vehicle exiting the interface region, instructions to cease application of one or more of the parameters of any operating parameters envelope previously transmitted.

10. The computer program product of claim 7, wherein the multilane road is a limited access highway and entering the interface region comprises at least one of entering the interface region via an on-ramp of the limited access highway and entering the interface region via a main lane of the multilane road.

11. The computer program product of claim 7 wherein the computer-executable program instructions further comprise computer-executable program instructions to receive a status for each third autonomous vehicle traversing the interface region in the first direction, and neither exiting nor entering, the interface region and wherein determining further comprises determining at least in part based on each received status, the operating parameters envelope for each third autonomous vehicle.

12. The computer program product of claim 7, wherein the computer-executable program instructions further comprise computer-executable program instructions to receive, from at least one traffic system covering an area beyond interface region in the direction of traffic, traffic data applicable to the area beyond the interface region, and wherein the determining is further based at least in part on the received traffic data applicable to the area beyond the interface region.

13. A system to control autonomous vehicles in interface regions of multilane roads, comprising:

a storage device; and a processor communicatively coupled to the storage device, wherein the processor executes application code instructions that are stored in the storage device to cause the system to:

receive, from at least one first autonomous vehicle entering an interface region of a multilane road in a first direction, a current first autonomous vehicle destination;

receive, from at least one second autonomous vehicle exiting the interface region from the first direction, a current second autonomous vehicle status as exiting the multilane road;

receive, from at least one traffic system covering the interface region, traffic data applicable to the interface region;

determine, based at least in part on each received destination, each received exiting status, and the received traffic data, an operating parameters envelope for each autonomous vehicle remaining on the multilane road in the interface region in the first direction wherein the processor is separate and distinct from each autonomous vehicle, and the operating parameters envelope comprises at least one parameter of: one or more discouraged lanes, one or more lane prohibitions, a target speed, a follow distance, and a congestion indication for one or more lanes; and transmit, to each corresponding autonomous vehicle remaining on the multilane road in the interface region in the first direction, instructions to apply the corresponding determined operating parameters envelope.

14. The system of claim 13, wherein entering the interface region comprises, for each first autonomous vehicle, one of:

entering the interface region while traveling on the multilane road, and entering the multilane road; and exiting the interface region comprises, for each second autonomous vehicle, one of:

exiting the interface region while traveling on the multilane road, and exiting the multilane road.

15. The system of claim 13, wherein the processor executes application code instructions that are stored in the storage device to cause the system to transmit, to each autonomous vehicle exiting the interface region, instructions to cease application of one or more of the parameters of any operating parameters envelope previously transmitted.

16. The system of claim 13, wherein the multilane road is a limited access highway and entering the interface region comprises at least one of entering the interface region via an on-ramp of the limited access highway and entering the interface region via a main lane of the multilane road.

17. The system of claim 13 further comprising application code instructions that are stored in the storage device to cause the system to receive a status for each third autonomous vehicle traversing the interface region in the first direction, and neither exiting nor entering, the interface region, and wherein determining further comprises determining at least in part based on each received status, the operating parameters envelope for each third autonomous vehicle.

* * * * *